(12) United States Patent
Liu et al.

(10) Patent No.: US 7,680,149 B2
(45) Date of Patent: Mar. 16, 2010

(54) CPRI LINK MULTIPLEX TRANSMISSION METHOD AND SYSTEM

(75) Inventors: Sheng Liu, Guangdong (CN); Bill Huang, Alameda, CA (US)

(73) Assignee: Utstarcom Telecom Co., Ltd., Zhejiang (CH)

( * ) Notice: Subject to any disclaimer, the term of this patent is extended or adjusted under 35 U.S.C. 154(b) by 356 days.

(21) Appl. No.: 11/555,025

(22) Filed: Oct. 31, 2006

(65) Prior Publication Data
US 2007/0116046 A1    May 24, 2007

(30) Foreign Application Priority Data
Oct. 31, 2005    (CN)    .................... 2005 1 0118606

(51) Int. Cl.
*H04J 3/16*    (2006.01)
(52) U.S. Cl. .................... 370/466; 370/907; 370/535; 370/522; 370/464; 370/467

(58) Field of Classification Search ................. 370/466, 370/464, 467, 535, 522, 907
See application file for complete search history.

(56) References Cited

U.S. PATENT DOCUMENTS

| 7,313,333 | B2 * | 12/2007 | Lee et al. | ............. 398/209 |
| 2003/0112833 | A1 * | 6/2003 | Kamiya | ............. 370/535 |
| 2005/0105552 | A1 * | 5/2005 | Osterling | ............. 370/466 |

* cited by examiner

*Primary Examiner*—Huy D Vu
*Assistant Examiner*—Omer Mian
(74) *Attorney, Agent, or Firm*—Harness, Dickey & Pierce, P.L.C.

(57) ABSTRACT

A communication method between the units of a distributed base station system, characterized by comprising: at the transmitting end, mapping a CPRI link to a GFP-T frame; encapsulating the GFP-T frame into SDH virtual containers to form a STM-N frame; and transmitting the STM-N frame via a SDH line, and at the receiving end, receiving the STM-N frame transmitted via the SDH line; separating the SDH virtual containers from the STM-N frame; extracting the GFP-T frame from the SDH virtual containers; reproducing the CPRI link from the GFP-T frame.

37 Claims, 14 Drawing Sheets

Transmitting end

Receiving end

| PTI = 000 | |
|---|---|
| UPI value | GFP frame payload |
| 0000, 0000, 1111, 1111 | Reserved unused |
| 0000, 0001 | Frame mapping Ethernet MAC |
| 0000, 0010 | Frame mapping PPP |
| 0000, 0011 | Transparent optical fiber channel |
| 0000, 0100 | Transparent FICON |
| 0000, 0101 | Transparent ESCON |
| 0000, 0110 | Transparent GB Ethernet |
| 0000, 0111 | reserved |
| 0000, 1000 | Frame mapping MAPOS |
| 0000, 1001 ~ 1110, 1111 | Reserved for future standard |
| 1111, 000 ~ 1111, 1110 | Reserved for exclusive use |

(a) User data frame

| PTI = 100 | |
|---|---|
| UPI value | GFP frame payload |
| 0000, 0000, 1111, 1111 | Reserved unused |
| 0000, 0001 | Client signal failure (lose client signal) |
| 0000, 0010 | Client signal failure (lose client character synchronization) |
| 0000, 0011, 1111, 1110 | Reserved for future use |

(b) Client management frame

Fig. 5

| VC type | VC bandwidth | VC payload bandwidth |
|---|---|---|
| VC-11 | 1664 Kbit/s | 1600 Kbit/s |
| VC-12 | 2240 Kbit/s | 2176 Kbit/s |
| VC-2 | 6848 Kbit/s | 6784 Kbit/s |
| VC-3 | 48.960 Mbit/s | 48.384 Mbit/s |
| VC-4 | 150.336 Mbit/s | 149.760 Mbit/s |
| VC-4-4c | 601.344 Mbit/s | 599.040 Mbit/s |
| VC-4-16c | 2405.376 Mbit/s | 2396.160 Mbit/s |
| VC-4-64c | 9621.504 Mbit/s | 9584.640 Mbit/s |
| VC-4-256c | 38486.016 Mbit/s | 38338.560 Mbit/s |

Fig. 9

CPRI LINK MULTIPLEX TRANSMISSION METHOD AND SYSTEM

TECHNICAL FIELD

The present invention relates to a distributed base station technique in a mobile communication system, and in particular relates to a multiplex transmission method and system based on CPRI links in a distributed base station system.

BACKGROUND TECHNOLOGY

In a mobile communication system, as shown in FIG. 1a, a wireless access network is typically composed of base stations (BTS) and a base station controller (BSC) or wireless networks controller (RNC) for controlling the base stations. The base station is mainly composed by units such as a baseband processing subsystem, a radio frequency (RF) subsystem, and antennas, which are in charge of performing transmission, reception and processing of wireless signals. As shown in FIG. 1b, one base station may cover different cells through a plurality of antennas.

In mobile communication systems, there are wireless network coverage problems that are more difficult to solve with conventional BTS technologies, such as, indoor coverage of high-rise buildings, coverage hole, or the coverage of shadow zone. A technique based on remote radio frequency units is a more effective solution being proposed to solve the above problems. In the distributed base station system based on remote radio frequency units, the primary radio frequency units and antennas are installed in regions that are required to provide coverage, and are connected to other primary baseband processing units in the base station through wideband transmission lines. The broadband transmission link connecting a remote radio frequency unit and a primary baseband processing unit may typically employ transmission medium such as optical fiber, coaxial cable, microwave and etc.

For the wireless signal transmission between a remote radio frequency unit (RRU) and a primary baseband processing unit (MU), it is possible to employ the analog signal transmission scheme or the digital transmission scheme. Although it is easier to adopt the analog signal transmission scheme, there will be disturbing components such as noise in analog lines, and the modulation of signals in the transmission will introduce nonlinear distortion. Therefore, the transmission distance between the remote radio frequency unit and the primary baseband processing unit is limited, usually in a range of several hundreds meters. In addition, the analog transmission is not suitable for the application of multiplexing technique, and may decrease the utilization of transmission lines. To this end, for the distributed base station system having this typical structure, CPRI (Common Public Radio Interface) provides standardization for the interface between the remote radio frequency unit and the primary baseband processing unit based on the digital transmission technique (its technical specification can be obtained from the website <http://www.cpri.info/spec.html>). At present, many commercial distributed base station system based on the standard have already been developed in the industry.

In the CPRI specification, terms "RE" (radio element) and "REC" (radio element controller) radio element controller correspond to the remote radio frequency unit and the primary baseband processing unit, and the interface between the RE and the REC is the CPRI link. In the CPRI protocol stack structure as shown in FIG. 2, the user plane is in charge of transmitting baseband I/Q data; The control and management plane mainly includes in-band signaling with higher real time requirement, and layer 3 protocol data (not defined by CPRI) carried on the layer 2 protocol HDLC (high level data link control) and Ethernet. Information including user plane data, control and management plane data, sync data and vendor specific data is multiplexed on the electrical or optical transmission line in a time division multiplexing mode.

Since the CPRI link is a kind of point-to-point link, each CPRI link will occupy one physical line, i.e., one optical fiber or one wavelength (when using the wave division multiplexing technique). Although the CPRI presently defines three line rates of 614.4 Mbit/s, 1228.8 Mbit/s (2×614.4 Mbit/s) and 2457.6 Mbit/s (2×1228.8), so that one CPRI link may transmit multiple I/Q baseband signals, since the limitation of the line rates, the number of I/Q baseband signals that can be transmitted through one CPRI link is very limited, and it is difficult to implement network connections of a large quantity of RRUs in a high-capacity distributed base station. On the other hand, although the CPRI define control and management information channels, the band width of these channels is very limited (less than 1/16 of the CPRI link rate). When it is necessary to transmit other signal links such as STM-N, ATM, 100/1000M Ethernet in the meantime, it will be difficult to transmit them through CPRI and have to employ additional transmission lines, thereby increasing the transmission cost and the wasting of optical fiber resources.

SUMMARY OF THE INVENTION

To the problem that it is difficult to implement high-capacity multiplexing through the above existing CPRI links, the present invention proposes a CPRI link multiplex transmission technique and corresponding MSTP multiple service transmission platform) transmission system compatible with the existing telecommunication transmission network, which can directly access the existing SDH transmission network.

The present invention provides a communication method between the units of a distributed base station system, characterized by comprising: at the transmitting end, mapping a CPRI link to a GFP-T frame; encapsulating the GFP-T frame into SDH virtual containers to form a STM-N frame; and transmitting the STM-N frame via a SDH line, and at the receiving end, receiving the STM-N frame transmitted via the SDH line; separating the SDH virtual containers from the STM-N frame; extracting the GFP-T frame from the SDH virtual containers; Reproducing the CPRI link from the GFP-T frame.

The present invention further provides a transceiver in a distributed base station system for transmitting and receiving CPRI frames via CPRI links and transmitting and receiving STM-N frames via SDH links, characterized by comprising: a transmission processing device, comprising: means for mapping a CPRI link to a GFP-T frame; means for encapsulating the GFP-T frame into SDH virtual containers; and means for forming a STM-N frame; and a reception processing device, comprising: means for separating the SDH virtual containers from the STM-N frame; means for extracting the GFP-T frame from the SDH virtual containers; and means for reproducing the CPRI frame from the GFP-T frame.

In one embodiment, said means for mapping comprises: means for performing 8B/10B to 64B/65B line encoding transformation to the CPRI link, and said means for reproducing comprises means for performing 64B/65B to 8B/10B line encoding transformation.

In one embodiment, said means for mapping comprises: means for performing compression to a basic CPRI frame before the mapping to remove reserved bits, wherein the means incorporates information indicating compression state of the CPRI frame in the GFP-T frame; and means for generating information indicating the format of uncompressed basic CPRI frame, and said means for reproducing comprises: means for determining whether the basic CPRI frame is compressed based on said information indicating the compression state, and if so, decompressing the compressed basic CPRI frame based on said format information of the basic CPRI frame.

The present invention further provides a remote radio frequency unit in a distributed base station system for transmitting and receiving STM-N frames via a SDH link, characterized by comprising: a transmission processing device, comprising: means for mapping a CPRI link to a GFP-T frame; means for encapsulating the GFP-T frame into SDH virtual containers; and means for forming a STM-N frame; and a reception processing device, comprising: means for separating SDH virtual containers from a STM-N frame; means for extracting a GFP-T frame from the SDH virtual containers; and means for reproducing a CPRI frame from the GFP-T frame.

The present invention further provides a primary baseband processing unit in a distributed base station system for transmitting and receiving STM-N frames via a SDH link, characterized by comprising: a transmission processing device, comprising: means for mapping a CPRI link to a GFP-T frame; means for encapsulating the GFP-T frame into SDH virtual containers; and means for forming a STM-N frame; and a reception processing device, comprising: means for separating SDH virtual containers from a STM-N frame; means for extracting a GFP-T frame from the SDH virtual containers; and means for reproducing the CPRI frame from the GFP-T frame.

The present invention further provides a distributed base station system, wherein a remote radio frequency unit communicates with a primary baseband processing unit through an integrated or separate transceiver device via SDH links, characterized in that the transceiver device comprises: a transmission processing device, comprising: means for mapping a CPRI link to a GFP-T frame; means for encapsulating the GFP-T frame into SDH virtual containers; and means for forming a STM-N frame; and a reception processing device, comprising: means for separating the SDH virtual containers from the STM-N frame; means for extracting the GFP-T frame from the SDH virtual containers; and means for reproducing the CPRI frame from the GFP-T frame.

Since the SDH has a sophisticated line protection and self healing mechanism, its flexible networking mode and sophisticated network management functionality considerably enhance the networking ability and reliability of the distributed base station based on CPRI links. At the same time, it is possible to realize the data transmission between nodes, including between a RRU and a primary base station, between a BTS and a BSC/RNC, and between a BTS and another BTS, in a wireless access network by using the same transport network (a new structure of the wireless access network), thereby considerably reducing the network constructive complexity and cost, and making the networking flexible and easy to maintain.

DESCRIPTION OF THE DRAWINGS

The above and/or other aspects, features and/or advantages of the present invention will be further appreciated in view of the following description by referring to the accompanying figures, wherein:

FIG. 5 enumerates UPI values and user data types in the GFP frame payload;

FIG. 9 enumerates the type and capacity of virtual containers of the SDH;

DETAILED DESCRIPTION OF THE PREFERRED EMBODIMENTS

Figure 1A:
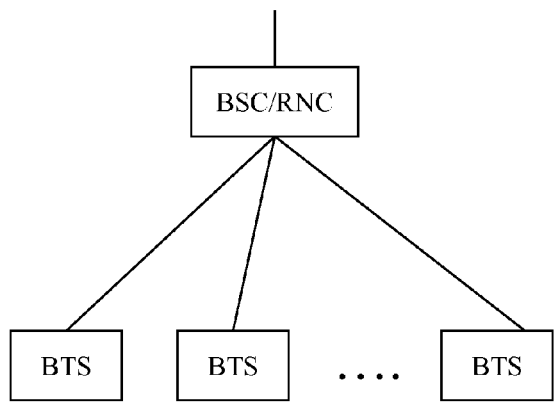
FIG. 1a is a schematic diagram showing the structure of a wireless access network.
Figure 1B:
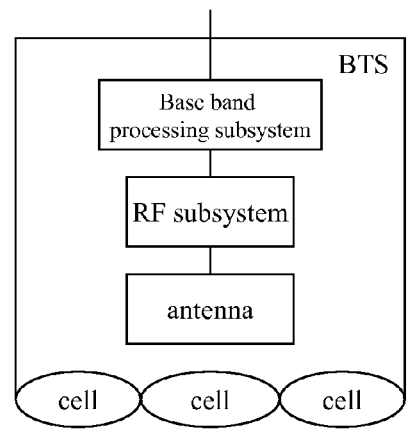
FIG. 1b is a schematic diagram showing the structure of a conventional base station.
Figure 2:
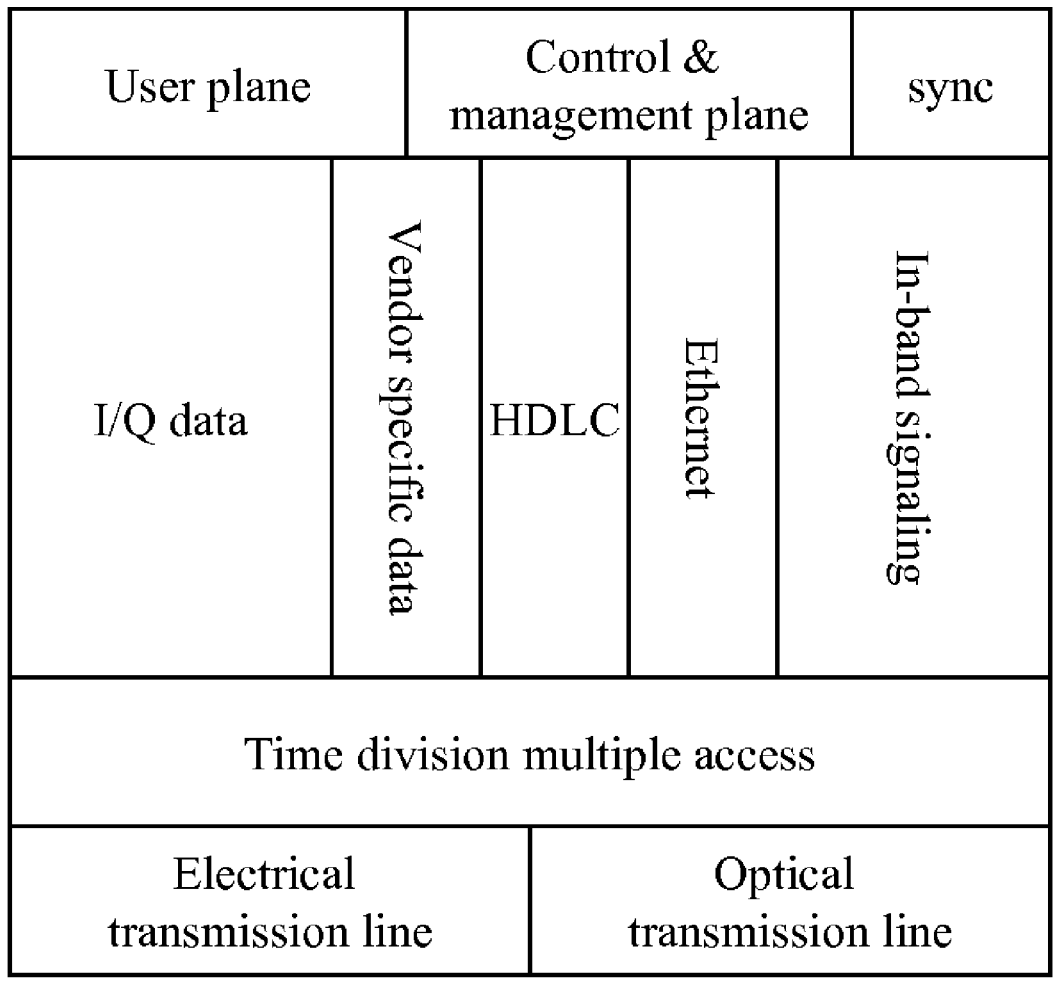
FIG. 2 shows the architecture of the CPRI protocol.
Figure 3:
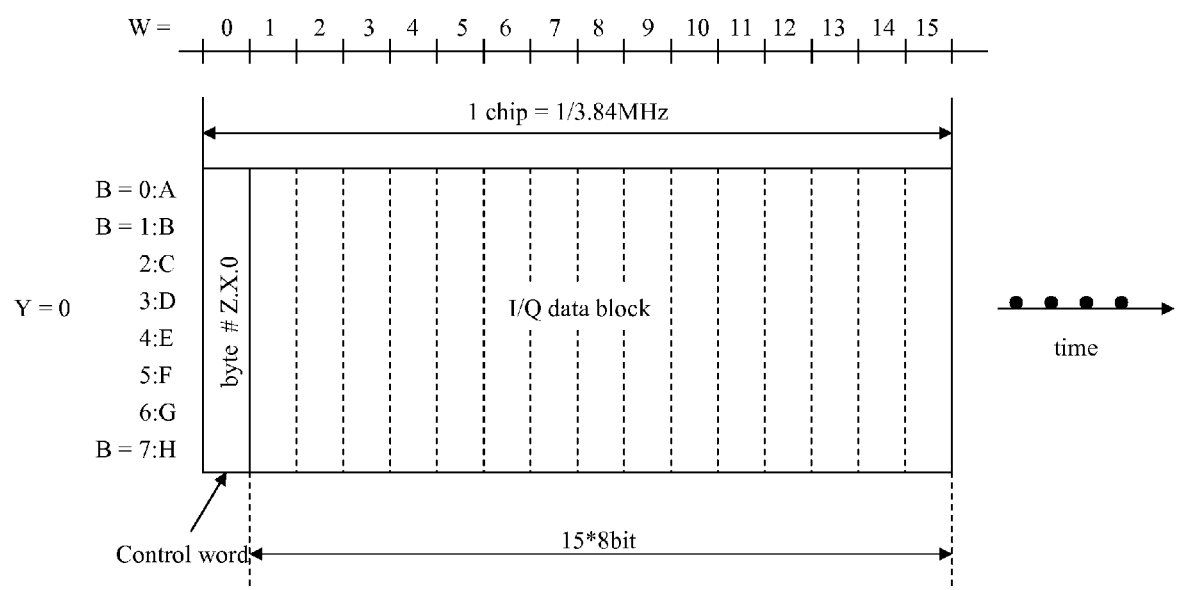
FIG. 3 show the frame structure of a CPRI link having a line rate of 614.4 Mbit/s.

The CPRI is basically a synchronous transmission link based on a certain frame structure, and the length of its basic frame is the width of one WCDMA chip, i.e., 1/3.84 MHz=260.416667 ns. One basic frame is composed of 16 words with serial number W=0 . . . 15 (the word with serial number W=0 is a control word, for transmitting information such as control and management plane data and sync data, the other words are used for transmitting I/Q data). Presently, the CPRI altogether defines three line rates, i.e., 614.4 Mbit/s, 1228.8 Mbit/s (2×614.4 Mbit/s) and 2457.6 Mbit/s (2×1228.8 Mbit/s). The CPRI frame structure is the same for all the line rates, but the word length of respective basic frame is different (the word length is 8, 16, 32 bits respectively, or is 1, 2, 4 bytes respectively). The 8B/10B line encoding is applied to the physical lines of CPRI, as shown in FIG. 3. The CPRI link with a rate of 614.4 Mbit/s has a rate of 491.52 Mbit/s before the line encoding, and its line rate becomes 614.4 Mbit/s after the 8B/10B line encoding.

On the basis of the basic frame, every 256 basic frames further form one superframe, and 150 superframes correspond to one UMTS physical frame with a length of 10 ms. For the convenience of denotation, in the CPRI specification, Z (=0 . . . 149) denotes the superframe number of one of superframes which a UMTS physical frame of 10 ms corresponds to, X (X=0 . . . 255) denotes the frame number of one of basic frames which a superframe corresponds to, W (W=0 . . . 15) denotes the serial number of one of words which a basic frame corresponds to, Y (Y=0 . . . 3) denotes the serial number of one of bytes forming a word in a basic frame, B (B=0 . . . 31) denotes the serial number of one of bits forming a word in a basic frame. According to the CPRI specification, the CPRI obtains superframe synchronization through sync byte K28.5 of control word Z.0.0 and superframe number HFN of control word Z.64.0 within each superframe, and further implements CPRI frame synchronization.

Figure 4:
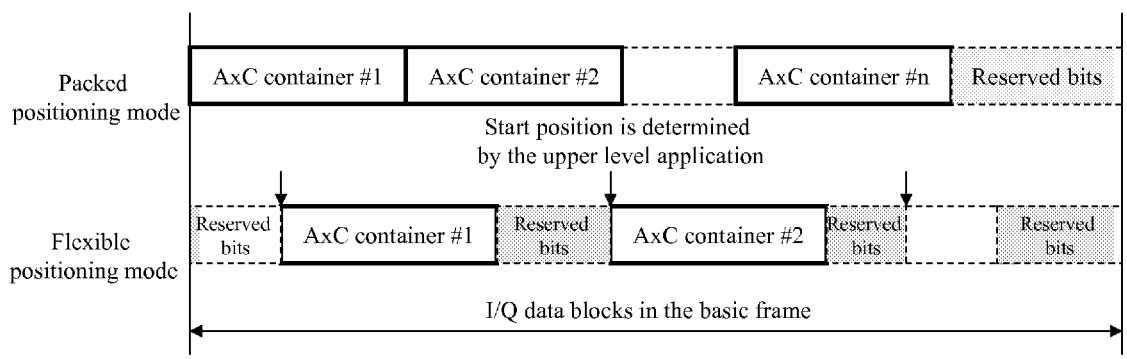
FIG. 4 shows two ways of mapping an A×C container to a basic frame.

According to the CPRI specification, I/Q data is mapped into a basic frame in units of antenna carrier frequency container (A×C container), one A×C container contains the I/Q sample data within one UMTS chip of one carrier frequency of one antenna, and one basic frame may contain a plurality of A×C containers, therefore one CPRI link may carry the I/Q sample data of a plurality of carrier frequencies of multiple antennas. The A×C containers may be mapped into one basic frame in packed positioning mode or flexible positioning mode. As shown in FIG. 4, in the packed positioning mode, the A×C containers are continually mapped in order into one basic frame, and the remaining bits are reserved bits, and in the flexible positioning mode, the A×C containers may be mapped into one basic frame according to the position specified by the application, and other bit not occupied by the A×C container in the frame are reserved bits.

General framing protocol (GFP) is a new technology unitedly recommended by ITU-T and ANSI for adapting a data stream of block encoding or packet type to a consecutive byte-synchronized transmission channel such as SDH (synchronous digital hierarchy) and OTN (optical transmit network) channel. For its detailed technical specification, please see ITU-T standard G.7041 or ANSI standard T1X1.5/2000-024R3.GFP is divided into two types, one is frame mapped GFP (GFP-F) supporting PDU (protocol data unit) type, another is transparent GFP (GFP-T) supporting block encoding type, wherein GFP-F can be used for adaptation of packets of protocols such as IP/PPP, MPLS and Ethernet MAC, and GFP-T can be used for directly adapting block encoding character streams on the lines such as giga Ethernet, and therefore can satisfy the requirement of applications with very low delay requirements, but causes a transmission bandwidth utilization lower than GFP-F.

One GFP frame is composed of a core header and a payload portion, wherein the payload portion includes a payload header, a payload and an optional payload FCS (frame check sequence). The core header is composed of a PLI field indicating the length of the payload and a core header error control field cHEC. Besides providing bit error protection for the core header, the cHEC also provides GFP frame demarcation similar to the ATM cell demarcation. The payload header indicates payload types, and provides bit error protection by the tHEC, wherein payload type identifier (PTI) indicates that the GFP-T frame carries user data when it is "000", and indicates that the GFP-T frame carries client management information when it is "100"; payload FCS indicator (PFI) indicates whether there is the payload FCS; user payload identifier (UPI) and the PTI together indicate the types of user data or client management information in the payload, as shown in FIG. 5. Furthermore, extension header identifier (EXI) indicates the presence of a optional extension header and its type, and a typical application of extension header presently is to provide channel identifier (CID) to support multiplexing a plurality of individual client signals.

Figure 6:
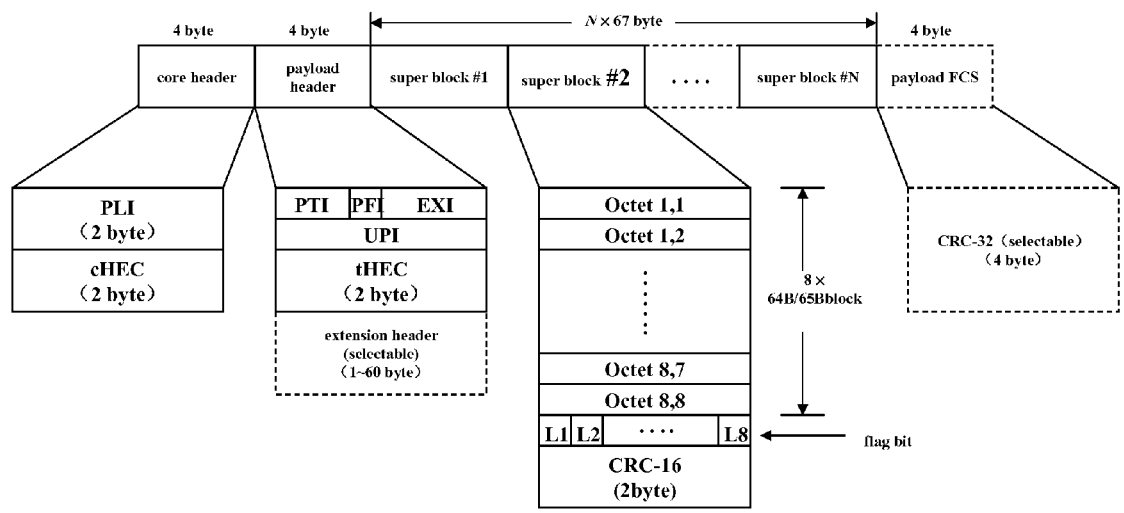
FIG. 6 shows the structure of a GFP-T frame.

Transparent mode GFP is specially designed for direct adaptation of client signals using 8B/10B line encoding. As shown in FIG. 6, the payload in the GFP-T frame is formed by super blocks with fixed length each of which are formed by 64B/65B code blocks sequentially, and since the 64B/65B code block contains user data character and control character (including padding character), a flag bit is used to indicate whether there is a control character in the 64B/65B code block, wherein the high 4 bits of the control character are used to indicate the existence of the subsequent control character and the position of the control code in the original 8B/10B code stream, and the low 4 bits are used to transmit the control code itself.

Figure 7:
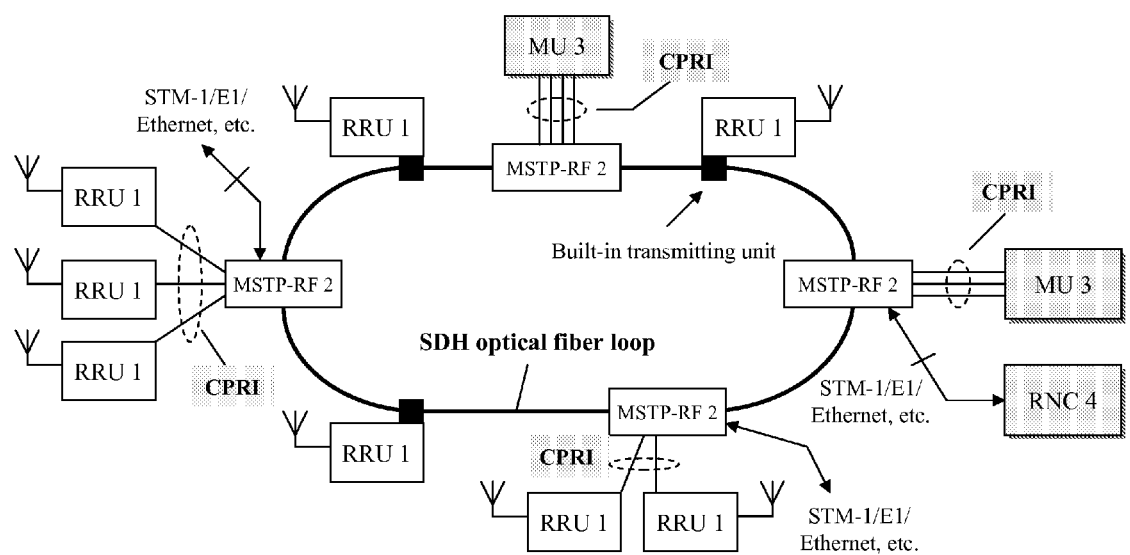
FIG. 7 shows a system architecture according to the present invention.

FIG. 7 shows a system architecture according to the present invention. A plurality of MUs 3, respective RRU units 1 corresponding to the MUs and RNC 4 as shown are connected through a SDH link, wherein nodes MSTP-RF 2 are responsible for implementing transmission of multiple protocols including CPRI on the SDH (synchronization digital hierarchy), and may also be implemented as internal transmitting units of devices such as RRU and etc. According to the present invention, MSTP-RF can not only transmit multiple CPRI links of various rates, but also transmit links such as STM-M, E1/T1, ATM (asynchronous transfer mode), 100/1000M Ethernet and etc., and therefore, according to the present invention, it is possible to implement the use of unified transmission lines and transmission equipments, to implement networking of wireless access networks using distributed base station technique, and to implement mixed networking of conventional wireless access networks using normal base stations such as WCDMA, GSM and etc. Although the SDH adopts loop topology in FIG. 7 for convenience of explanation, the present invention is also applicable for SDH networking structures such as star type, chain type, tree type and etc.

Figure 8:
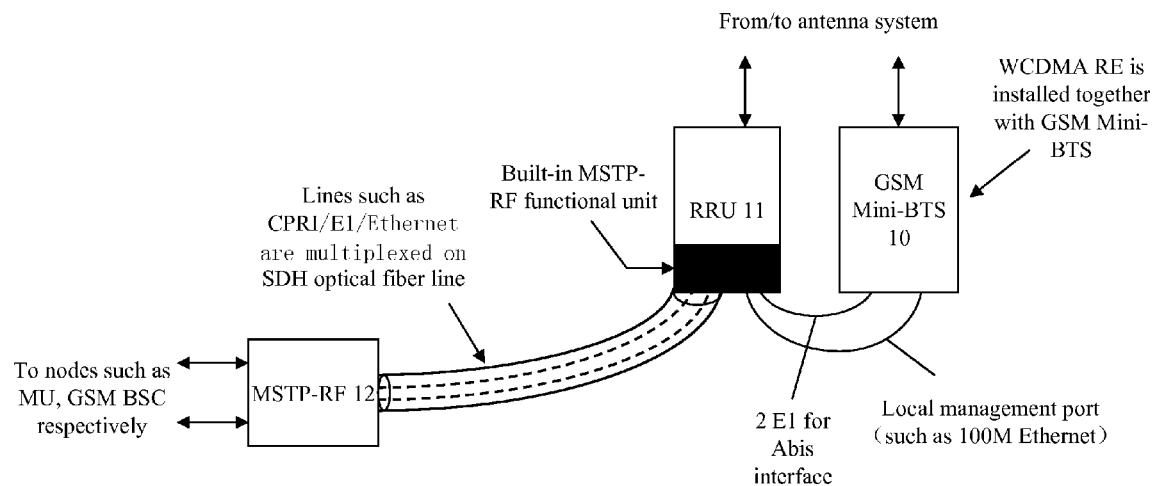
FIG. 8 shows an application example where a WCDMA RRU and a GSM Mini-BTS share a station address according to the CPRI.

FIG. 8 shows an application example where a WCDMA RRU 11 and a GSM Mini-BTS 10 share a station address according to the CPRI interface. Since the WCDMA RRU and the GSM Mini-BTS are similar in their volume, working environment and etc., they can be installed based on sharing station address, thereby considerably reducing network construction cost. The connection between the GSM Mini-BTS and the GSM network includes an Abis interface using E1 as physical line and a local management interface using 100M Ethernet as an interface, and therefore, by using the present invention, it is possible to implement the WCDMA RRU's CPRI link and link transmission of E1, 100M Ethernet and etc. used by the GSM Mini-BTS by employing unified SDH optical fiber lines.

According to the present invention, whether working as an independent node or as an internal transmitting unit in the device such as RRU, the MSTP-RF is formed by adding the support for CPRI link transmission on the basis of conventional MSTP transmission equipments. In the existing MSTP transmission technique, the MSTP device is in charge of accessing, converging and transmitting the traffic, and at the same time, it is possible to perform a majority of cross-connection function on the edge of the network; The supported interface includes TDM (time-division multiplex) interface (T1/E1, T3/E3), SDH interface (OC-N/STM-M), Ethernet interface (10/100M Ethernet, giga Ethernet GE), POS (packet over SDH) interface, ATM interface and etc.; As a transmission equipment based on SDH, the MSTP device usually supports SDH network elements including TM (terminal multiplexer), ADM (add/drop multiplexer) and MADM (multiple add/drop multiplexer).

Figure 14:
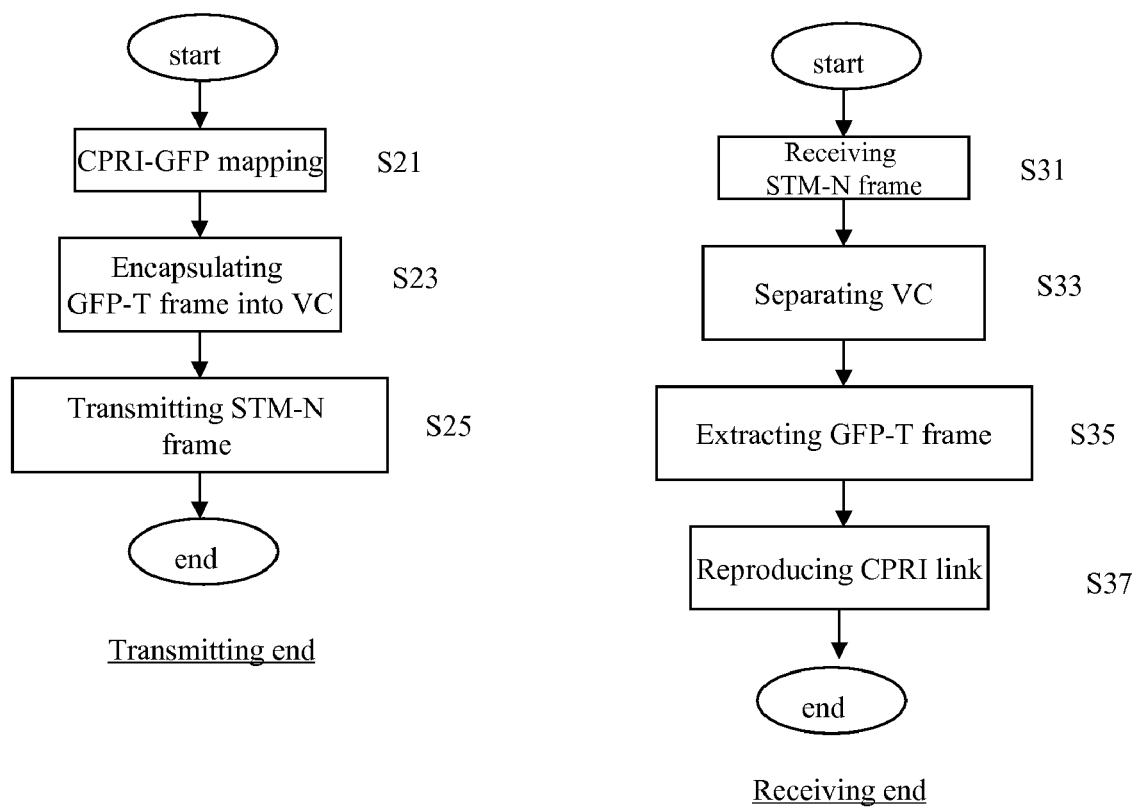
FIG. 14 shows the flow chart of a method of implementing transmission of a CPRI link on the SDH according to the present invention.

FIG. 14 shows the flow chart of a method of implementing transmission of a CPRI link on the SDH according to the present invention. According to the method, at the transmitting end, at step S21, the CPRI link is mapped into a GFP-T frame, and at step S23, the GFP-T frame is encapsulated into virtual containers (VC) of SDH to form a STM-N frame, and then at step S25, the STM-N frame is transmitted via a SDH line. As shown in FIG. 9, basic virtual containers of SDH include VC-11, VC-12, VC-2, VC-3 and VC-4, and VC-4 may further form four virtual containers VC-4-4c, VC-4-16, VC-4-64 and VC-4-256c with higher rates through sequentially cascading. Although the virtual cascading (VCAT) technique allows for more transmission bandwidth choices by repeatedly multiplexing a plurality of virtual containers with the same rates to facilitate increasing link transmission efficiency, since respective virtual containers arrive at the receiving end via independent transmission paths, the transmission delay is larger. But the CPRI requires a very low transmission delay, therefore it is preferable to use basic virtual containers such as VC-4, and high rate virtual containers such as sequentially cascade-connected VC-4-4c, VC-4-16c, VC-4-64c and VC-4-256c to carry GFP-T frames with CPRI link encapsulated. At the receiving end, at step S31, the STM-N frame transmitted via the SDH line is received, at step S33, the SDH virtual containers are separated from the STM-N frame, at step S35, the GFP-T frame is extracted from the SDH virtual containers, and then at step S37, the CPRI link is reproduced from the GFP-T frame.

As noted earlier, the CPRI presently defines three line rates of 614.4 Mbit/s, 1228.8 Mbit/s (2×614.4 Mbit/s) and 2457.6 Mbit/s (2×1228.8 Mbit/s), and the VC payload band width of VC-4-4c and VC-4-16c (599.040 Mbit/s and 2396.160 Mbit/s) are slightly smaller than 614.4 Mbit/s and 2457.6 Mbit/s of CPRI respectively. However, since the CPRI link is a link via 8B/10B line encoding, in the procedure of mapping the CPRI link into the GFP-T frame, the 8B/10B to 64B/65B line encoding transformation will be performed at first, and thus, even if the overhead of frame structure such as header of GFP-T frame is taken into account, it is able to carry a CPRI link of corresponding rate.

As noted earlier, in the CPRI specification, I/Q data is mapped into a basic frame in units of A×C container. Usually, in either packed positioning mode (packed position) or flexible positioning mode (flexible position), the A×C containers in a basic CPRI frame cannot always fully occupy all the positions of I/Q data blocks in the basic CPRI frame, i.e., reserved bits still exist. For example, if a WCDMA uplink adopts an 8-bit sampling width, a 2×3.84 MHz sampling rate and a twin antenna reception diversity, then the rate of one A×C container is 122.88 MHz, and if a CPRI link of information rate 491.52 Mbit/s (line rate 614.4 Mbit/s) is used to carry two A×C containers, there remains an idle bandwidth of 215.04 MHz after removing the band width of control words in the basic CPRI frame. Apparently, the direct transmission of the CPRI frame will cause a substantive waste of the SDH line band width.

To this end, according to, besides directly mapping the CPRI link into a GFP-T frame for transmitting, for further increasing the band width utilization of the SDH link, it is also possible to perform compression to the basic CPRI frame by removing reserved bits and then to map into the GFP-T frame. As shown in FIG. 5(a), since for the user data frame as indicated by PTI=000, the user payload identifier (UPI) as defined by the existing GFP specification has not yet defined the client signal of CPRI type, it is possible to define a value of "0000,1001~1110,1111" to denote the uncompressed CPRI link signal and the compressed CPRI link signal respectively.

Figure 10:
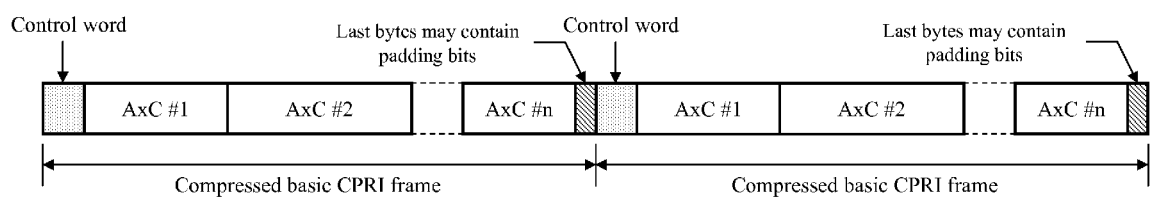
FIG. 10 shows a compressed CPRI frame with reserved bits being removed.

FIG. 10 shows a structure of the compressed basic CPRI frame by removing reserved bits, wherein the control word is on the foremost, and respective A×C containers are consecutively arranged in order. Since the A×C containers are not always byte-aligned, the last one byte may contain pad bits. Thus, the compressed basic CPRI frame is in units of byte and only contains the useful information such control word and respective A×C containers in the original basic CPRI frame. Since the compressed CPRI link is still a synchronization link in units of compressed basic frame with fixed length, it is possible to obtain the frame synchronization of the compressed CPRI link by using the frame synchronization method for the original CPRI link.

To be able to restore the positions of individual A×C containers in the basic CPRI frame at the opposite end, according to the present invention, it is possible to transmit relevant CPRI frame format information including the position information of the A×C container in the basic CPRI frame, through a corresponding GFP client management frame (CME frame) for carrying the GPF-T channel of the CPRI link. As noted earlier, the payload type identifier (PTI) in the GFP frame payload header is "100" for denoting that the GFP frame is s client management frame, as shown in FIG. 5 (b); when PTI=100, the value "0000,0000" and "1111,1111" of the user payload identifier (UPI) are reserved, "0000,0001" and "0000,0010" are used as client signal failure indication information about link stepout and etc.; therefore it is possible to use the reserved value between 00000011 and 11111110 to indicate the client management frame carrying the basic CPRI frame format information according to the present invention. Thus, the receiving end can know the frame format of the original basic CPRI frame including the position information of individual A×C containers in the basic CPRI frame through the GFP client management frame, thereby restoring the received compressed CPRI frame into a standard CPRI frame.

Since actually once the CPRI link starts its frame structure generally does not change or rarely change, the GFP client management frame carrying the basic CPRI frame format information including the position information of individual A×C containers in the basic CPRI frame only needs to be transmitted on the initial start-up and the change of basic CPRI frame format, and furthermore, it is also possible to transmit the GFP client management frame about the current basic CPRI frame format in a very low frequency, thereby preventing from missing the GFP client management frame and causing long duration CPRI link recovery error due to transmission bit error and etc.

According to the CPRI specification, the CPRI supports a slow C& M (control and management) channel based on HDLC and a fast C & M channel based on Ethernet, and basic CPRI frame format information including the positions of individual A×C containers in the basic CPRI frame is exchanged between RE and REC through the control and management signaling which is carried on these two kinds of C & M channels and has not yet been standardized by the CPRI specification. Therefore, to extract this information so as to perform CPRI frame compression, according to the present invention, a preferable solution is to monitor the control and management signaling of the corresponding CPRI link carried on the above two kinds of C & M channels in the MSTP-RF, thereby extracting the basic CPRI frame format information. This solution is compatible with the existing CPRI specification, but since the control and management signaling carried on the above two kinds of C & M channels is a nonstandard protocol, it is necessary to perform corresponding development for an internal protocol of a specific base station manufacturer.

Figure 11:
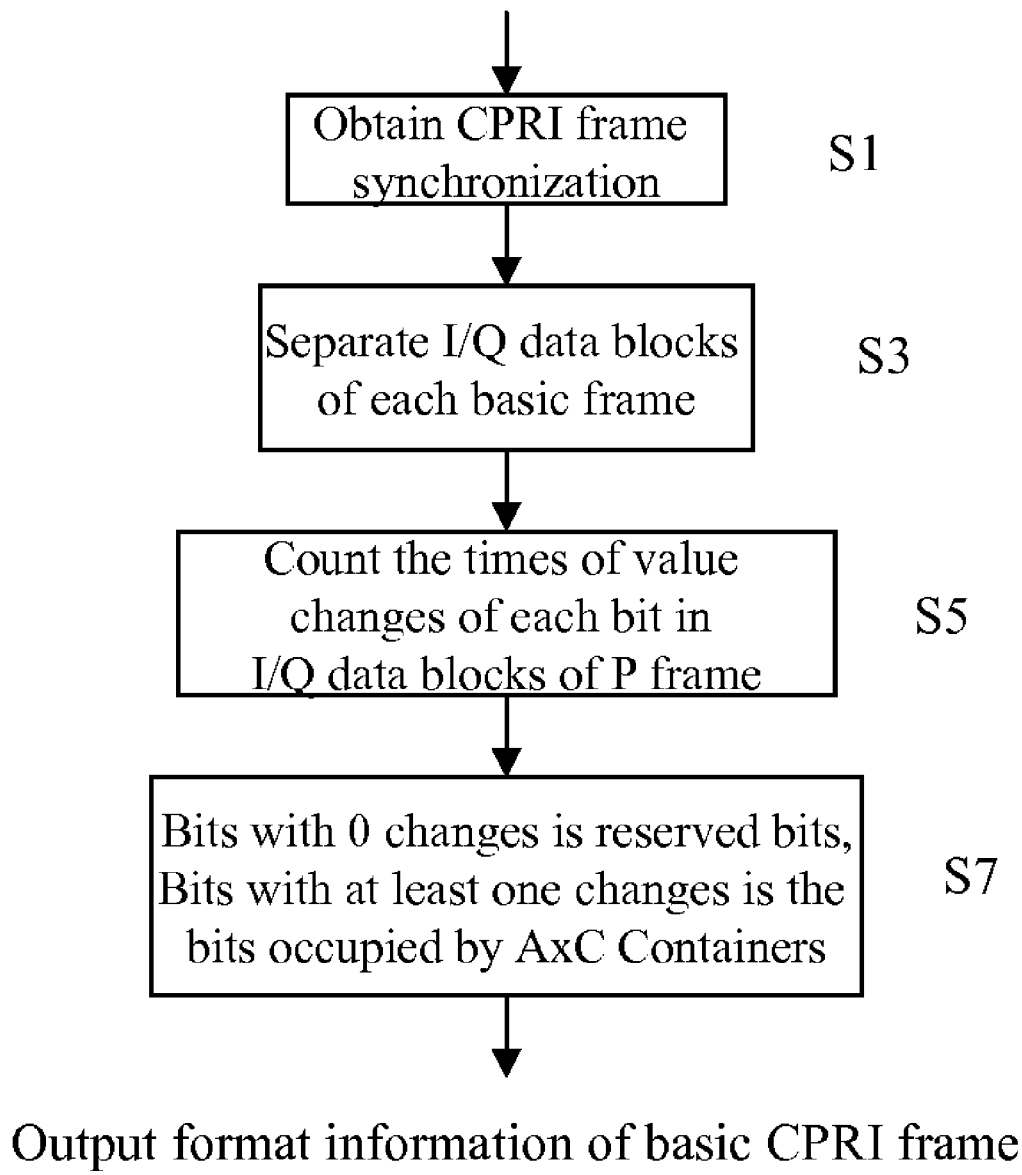
FIG. 11 shows a flow of obtaining the frame format information of a basic CPRI frame based on CPRI link data flow analysis.

According to another preferable solution of the present invention, instead of monitoring the nonstandard control and management signaling carried on HDLC/Ethernet, the basic CPRI frame format information is obtained by directly analyzing the CPRI link data stream. Actually, according to the basic CPRI frame structure as shown in FIG. 3 and FIG. 4, the position of the control word is fixed, and if there are reserved bits in the I/Q data block, the pad bits of these reserved bits are changeless, and the bits occupied by the A×C containers may be variable in every frame. Therefore, it is possible to utilize this property to obtain the basic CPRI frame format information by directly analyzing the CPRI link data stream. As a nonrestrictive exemplary example, FIG. 11 shows a flow of obtaining the basic CPRI frame format information by analyzing the CPRI link data stream. Firstly, obtains frame synchronization of CPRI (SI) so as to separate I/Q data blocks of individual basic frames (S3). Then counts the number of changes in the value of each bit in the I/Q data blocks of the P (P is a number far larger than 1) frames, wherein the change from "0" to "1" or the change from "1" to "0" of a bit in the same position of two adjacent frames is counted as one change of value, and the bit with a total number of changes of 0 is a reserved bit, and the bit with a number of changes of at least one is a bit occupied by an A×C container (S7). Finally, obtains the basic CPRI frame's frame format information based on the statistical result of individual bits.

Figure 12:
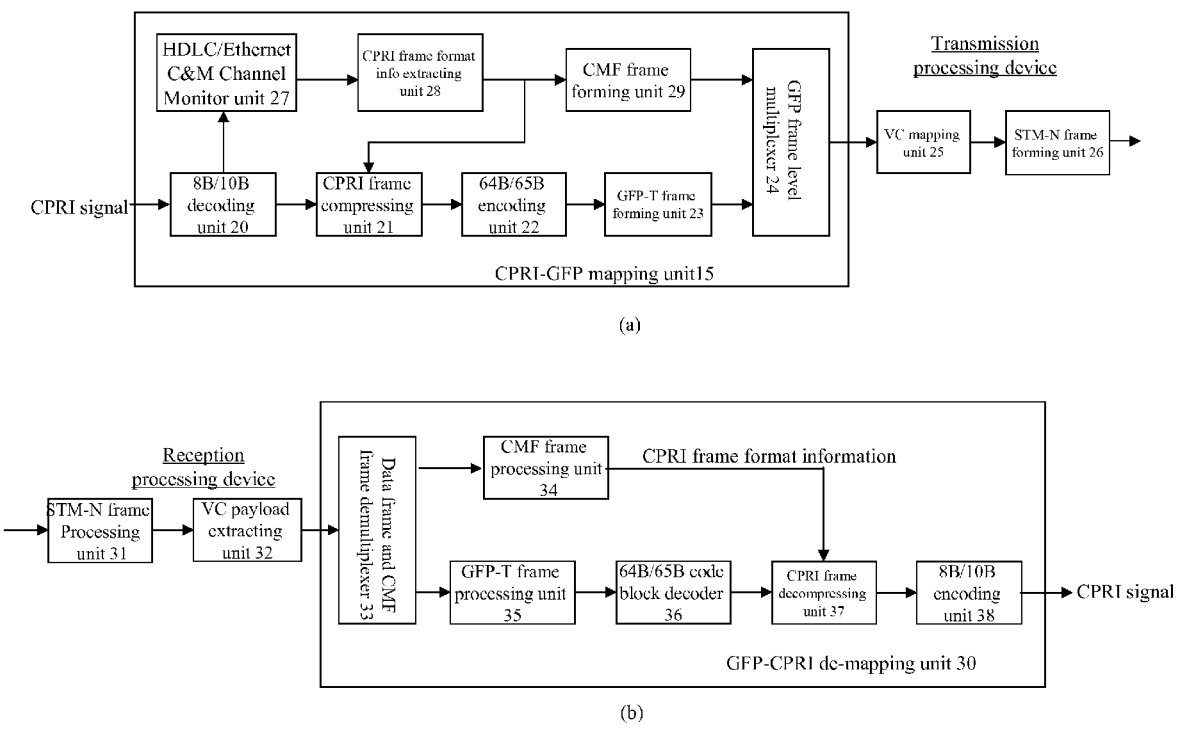
FIG. 12 shows a schematic structure of a MSTP-RF unit according to the present invention and a procedure of transmitting and receiving CPRI signals via the SDH transmission.

FIG. 12 shows a schematic structure of a MSTP-RF unit according to the present invention and a procedure of transmitting and receiving CPRI signals via the SDH transmission. The MSTP-RF unit comprises a reception processing device and a transmission processing device. The structure of the transmission processing device is as shown in FIG. 12 (a). The transmission processing device comprises a CPRI receiver and a SDH transmitter (not shown), a CPRI-GFP frame mapping unit 15, a VC mapping unit 25 and a STM-N frame forming unit 26. The CPRI signal received by the CPRI receiver (not shown) via the preceding corresponding link is mapped into a GFP-T frame by the CPRI-GFP frame mapping unit 15. The CPRI-GFP frame mapping unit 15 comprises an 8B/10B decoding unit 20, a CPRI frame compressing unit 21, a 64B/65B encoding unit 22, a GFP-T frame forming unit 23, a GFP frame level multiplexing unit 24, a HDLC/Ethernet C && M channel monitoring unit 27, a CPRI frame format information extracting unit 28 and a CMF frame forming unit 29.

The CPRI signal firstly undergoes 8B/10B decoding by the 8B/10B decoding unit 20, and then is removed of reserved bits by the CPRI frame compressing unit 21 to form a CPRI compressed frame. The CPRI signal after the 8B/10B decoding is used for the CPRI frame format information extracting unit 28 to extract the CPRI frame format information at the same time. If adopting the first method of extracting the CPRI frame format information, the control word channel data is delivered to the HDLC/Ethernet C && M channel monitoring unit 27 which extracts the control and management signaling stream carried on the HDLC/Ethernet C && M channel, and the CPRI frame format information can be extracted by performing analyzing on the control and management signaling stream. If adopting the second method of extracting the CPRI frame format information, the I/Q data blocks are directly analyzed to extract the basic CPRI frame's frame format information. The obtained basic CPRI frame format information on the one hand is used by the CMF frame forming unit 29 to generate a CMF frame carrying the basic CPRI frame format information, and on the other hand is delivered to the CPRI frame compressing unit 21 to control the compression operation on the CPRI frame. The data stream after the CPRI frame compression processing is delivered to the 64B/65B encoding unit 22 to generate 64B/65B code blocks and super blocks, to finally form a GFP-T data frame at the GFP-T frame forming unit 23. The CMF frame and the GFP-T data frame pass through the GFP frame level multiplexing unit 24 and the VC mapping unit 25, and finally form a STM-N frame which may be directly transmitted via the SDH line at the STM-N frame forming unit 26.

The structure of the reception processing device is as shown in FIG. 12 (b). The reception processing device comprises a CPRI transmitter and a SDH receiver (not shown), a STM-N frame separating unit 31, a VC payload extracting unit 32 and a GFP-CPRI de-mapping unit 30. The GFP-CPRI de-mapping unit 30 comprises a CMF frame demultiplexing unit 33, a GFP-T frame processing unit 35, a 64B/65B decoding unit 36, a CMF frame processing unit 34, a CPRI decompressing unit 37 and an 8B/10B encoding unit 38.

For the STM-N frame received by the SDH receiver, firstly the STM-N frame separating unit 31 separates the required VCs from the STM-N frame, and then the VC payload extracting unit 32 extracts the GFP frame from the VCs, and further, the data frame CMF frame demultiplexing unit 33 separates the CMF frame and the GFP-T data frame from the GFP frame. The GFP-T data frame passes through the GFP-T frame processing unit 35 to obtain individual 64B/65B code blocks, the 64B/65B code blocks pass through the 64B/65B decoding unit 36 to obtain the CPRI compressed frame data stream, and finally, the CPRI frame format information obtained from the CMF frame by the CMF frame processing unit 34 passes through the CPRI decompressing unit 37 and 8B/10B encoding unit 38 to reproduce the original CPRI link.

The above CPRI receiver and CPRI transmitter may be separate or combined, and may be outside the MSTP-RF unit. It is also true for the SDH transmitter and receiver.

In a mobile communication system, the requirement to the frequency stability of radio frequency units in a base station is high, and often needs a precision of 0.05 ppm. Therefore, the RRU needs to obtain a frequency reference of high stability. Although the CPRI is already a highly stable synchronization link, since the CPRI is transmitted via a GFP-T/SDH channel in the present invention, and usually the clock stability of the SDH network is far below the CPRI frequency stability of 0.05 ppm, along with dynamically inserting dummy bytes into the GFP-T channel for adaptive rate adaptation, it is necessary to recovery the original high stable clock of CPRI after the GFP-T/SDH channel transmission.

To this end, according to the present invention, it is possible to adopt two methods to recovery original high stable clock of CPRI link at the GFP-T/SDH channel end of the RRU side. One is to adopt a global common clock. A typical implementation method is that the MU and the MSTP-RF both obtain a frequency reference of high stability from a synchronous clock distribution network such as GPS (global positioning system), and take it as a sampling clock source for the digital wireless signal data stream and a CPRI link clock source. Thus, it is able to guarantee that the high stable requirement on the CPRI line clock can be satisfied at the GFP-T/SDH channel end on the RRU side. Another is to adopt an adaptive clock recovery technique which utilizes the feature of constant bit rate of the transmitted continuous data stream to recovery the clock of the constant data stream through a phase locked loop (PLL).

Figure 13:
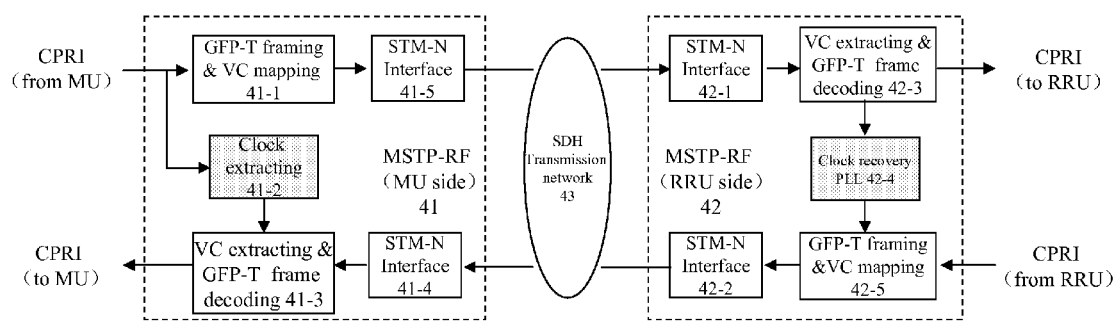
FIG. 13 illustrates the principle of adaptive clock recovery.

As shown in FIG. 13, in the downlink direction, the MSTP-RF interface 41 on the MU side transmits the CPRI link from the MU through the STM-N interface 41-5 via the SDH transmission network to the MSTP-RF 42 on the RRU side, after undergoing the operations such as GFP-T framing and VC encapsulating 41-1, and the MSTP-RF 42 on the RRU side reproduces the CPRI link after the operations such as VC extracting and GFP-T decoding 42-3 to deliver to the RRU. The MSTP-RF 42 on the RRU side adopts the PLL (phase lock loop) for performing loop control based on the FIFO (first in first out memory) filling degree to recovery the link clock of original CPRI. The clock is also used as the clock for the operation such as performing GFP-T framing and VC encapsulating on the CPRI link from the RRU in the uplink direction. The MSTP-RF on the MU side utilizes the clock extracted from the downlink direction CPRI link from the MU as the processing clock of the uplink direction CPRI link which is reproduced from the STM-N frame carrying the uplink direction CPRI link through the operations such as VC extracting and GFP-T decoding 41-3. In addition, the clocks of STM-N interfaces 41-5, 42-3 on the transmitting and receiving ends are directly extracted from the SDH line, not using the above CPRI link clock.

The invention claimed is:

1. A communication method between the units of a distributed base station system, the method comprising:
    at a transmitting end,
        mapping a Common Public Radio Interface (CPRI) ink to a General Framing Protocol-Transparent (GFP-T) frame;
        encapsulating the GFP-T frame into Synchronization Digital Hierarchy (SDH) virtual containers to form a Synchronous Transfer Module-Level N (STM-N) frame; and
        transmitting the STM-N frame via a SDH line, and
    at a receiving end,
        receiving the STM-N frame transmitted via the SDH line;
        separating the SDH virtual containers from the STM-N frame;
        extracting the GFP-T frame from the SDH virtual containers;
        reproducing the CPRI link from the GFP-T frame;
    wherein said mapping step comprises:
        performing compression on the basic CPRI frame to remove reserved bits before the mapping;
        including information indicating the compression state of the CPRI frame in the GFP-T frame; and
        transmitting information indicating the format in the uncompressed basic CPRI frame, and
    said reproducing step further comprises:
        determining if the basic CPRI frame is compressed based on the information indicating the compression state;
        if the basic CPRI frame is compressed, decompressing the compressed basic CPRI frame based on said basic CPRI frame format information; wherein
    said basic CPRI frame format information is included in a General Framing Protocol (GFP) client management frame corresponding to the GFP-T frame into which the basic CPRI frame is mapped; and the reserved value between 00000011 and 11111110 in the GFP client management frame is used to indicate carrying said basic CPRI frame format information.

2. The communication method of claim 1, wherein said mapping step further comprises:
    performing 8B/10B to 64B/65B line encoding transformation on the CPRI link, and
    said reproducing step comprises 64B/65B to 8B/10B line encoding transformation.

3. The communication method of claim 1, further comprising obtaining the basic CPRI frame format information to be transmitted by said mapping step through monitoring the control and management channel supported by CPRI.

4. The communication method of claim 3, wherein said control and management channel is a High Level Data Link Control (HDLC) channel or Ethernet channel.

5. The communication method of claim 1, further comprising obtaining the basic CPRI frame format information to be transmitted by said mapping step through analyzing the CPRI link data stream.

6. The communication method of claim 1, further comprising representing the information indicating the CPRI frame's compression state through the user payload identifier of a user data frame.

7. The communication method of claim 6, wherein the information indicating the CPRI frame's compression state is able to take a value between 00001001 and 11101111.

8. The communication method of claim 1, wherein said compressing step sequentially arranges individual Antenna Carrier Frequency (A×C) containers in order in the basic CPRI frame.

9. The communication method of claim 1, wherein the basic CPRI frame format information is transmitted only at time of initial start or change of basic CPRI frame format.

10. The communication method of claim 1, wherein the basic CPRI frame format information is transmitted in a low frequency.

11. The communication method of claim 1, wherein said reproducing step further comprises:
    recovering the clock of CPRI link through a global common clock or an adaptive clock recovery technique.

12. A transceiver device in a distributed base station system for transmitting and receiving Common Public Radio Interface (CPRI) frames via a Common Public Radio Interface (CPRI) link and transmitting and receiving Synchronous Transfer Module-Level N (STM-N) frames via a Synchronization Digital Hierarchy (SDH) link, the transceiver device comprising:
    a transmission processing device, comprising:
        means for mapping a CPRI link to a General Framing Protocol-Transparent (GFP-T) frame;
        means for encapsulating the GFP-T frame into SDH virtual containers; and
        means for forming a STM-N frame; and
    a reception processing device, comprising:
        means for separating the SDH virtual containers from a STM-N frame;
        means for extracting a GFP-T frame from the SDH virtual containers; and
        means for reproducing a CPRI frame from the GFP-T frame;
    wherein said means for mapping comprises:
        means for performing compression to a basic CPRI frame before the mapping to remove reserved bits, the means for performing compression including information indicating compression state of the CPRI frame in the GFP-T frame; and
        means for transmitting information indicating the format in the uncompressed basic CPRI frame, and
    said means for reproducing comprising:
        means for determining whether the basic CPRI frame is compressed based on said information indicating the compression state, and if the basic CPRI frame is compressed, decompressing the compressed basic CPRI frame based on said format information of the basic CPRI frame; wherein
    said basic CPRI frame format information is included in a General Framing Protocol (GFP) client management frame corresponding to the GFP-T frame into which the basic CPRI frame is mapped; and the reserved value between 00000011 and 11111110 in the GFP client management frame is used to indicate carrying said basic CPRI frame format information.

13. The transceiver device of claim 12, wherein said means for mapping comprises:
    means for performing 8B/10B to 64B/65B line encoding transformation on the CPRI link, and said reproducing means comprises means for performing 64B/65B to 8B/10B line encoding transformation.

14. The transceiver device of claim 12, wherein said means for generating comprises means for obtaining the basic CPRI frame format information through monitoring the control and management channel supported by CPRI.

15. The transceiver device of claim 14, wherein said control and management channel is a High Level Data Link Control (HDLC) channel or Ethernet channel.

16. The transceiver device of claim 12, wherein said means for generating comprises means for obtaining the basic CPRI frame format information through analyzing the CPRI link data stream.

17. The transceiver device of claim 12, further comprising representing the information indicating the CPRI frame's compression state through the user payload identifier of a user data frame.

18. The transceiver device of claim 17, wherein the information indicating the CPRI frame's compression state is able to take a value between 00001001 and 11101111.

19. The transceiver device of claim 12, wherein said means for compressing is configured to sequentially arrange individual Antenna Carrier Frequency (A×C) containers in order in the basic CPRI frame.

20. The transceiver device of claim 14, wherein the basic CPRI frame format information is transmitted only at time of initial start or change of basic CPRI frame format.

21. The transceiver device of claim 14, wherein the basic CPRI frame format information is transmitted in a low frequency.

22. The transceiver device of claim 12, wherein said means for reproducing is configured to recovery the clock of CPRI link through a global common clock or an adaptive clock recovery technique.

23. A remote radio frequency unit in a distributed base station system for transmitting and receiving Synchronous Transfer Module-Level N (STM-N) frames via a Synchronization Digital Hierarchy (SDH) link, the remote radio frequency unit comprising:
a transmission processing device, comprising:
means for mapping a Common Public Radio Interface (CPRI) link to a General Framing Protocol-Transparent (GFP-T) frame;
means for encapsulating the GFP-T frame into SDH virtual containers; and
means for forming a STM-N frame; and
a reception processing device, comprising:
means for separating the SDH virtual containers from a STM-N frame;
means for extracting a GFP-T frame from the SDH virtual containers; and
means for reproducing a CPRI frame from the GFP-T frame;
wherein said means for mapping comprises:
means for performing compression to a basic CPRI frame before the mapping to remove reserved bits, the means for performing compression including information indicating compression state of the CPRI frame in the GFP-T frame; and
means for transmitting information indicating the format in the uncompressed basic CPRI frame, and
said means for reproducing comprising:
means for determining whether the basic CPRI frame is compressed based on said information indicating the compression state, and if the basic CPRI frame is compressed, decompressing the compressed basic CPRI frame based on said format information of the basic CPRI wherein
said basic CPRI frame format information is included in a General Framing Protocol (GFP) client management frame corresponding to the GFP-T frame into which the basic CPRI frame is mapped: and the reserved value between 00000011 and 11111110 in the GFP client management frame is used to indicate carrying said basic CPRI frame format information.

24. The remote radio frequency unit of claim 23, wherein said means for mapping comprises:
means for performing 8B/10B to 64B/65B line encoding transformation on the CPRI link, and
said reproducing means comprises means for performing 64B/65B to 8B/10B line encoding transformation.

25. A primary baseband processing unit in a distributed base station system for transmitting and receiving Synchronous Transfer Module-Level N (STM-N) frames via a Synchronization Digital Hierarchy (SDH) link, the primary baseband processing unit comprising:
a transmission processing device, comprising:
means for mapping a Common Public Radio Interface (CPRI link to a General Framing Protocol-Transparent (GFP-T) frame;
means for encapsulating the GFP-T frame into SDH virtual containers; and
means for forming a STM-N frame; and
a reception processing device, comprising:
means for separating the SDH virtual containers from a STM-N frame;
means for extracting a GFP-T frame from the SDH virtual containers; and
means for reproducing a CPRI frame from the GFP-T frame;
said means for mapping comprises:
means for performing compression to a basic CPRI frame before the mapping to remove reserved bits, the means for performing compression including information indicating compression state of the CPRI frame in the GFP-T frame; and
means for transmitting information indicating the format in the uncompressed basic CPRI frame, and
said means for reproducing comprising:
means for determining whether the basic CPRI frame is compressed based on said information indicating the compression state, and if the basic CPRI frame is compressed, decompressing the compressed basic CPRI frame based on said format information of the basic CPRI wherein said basic CPRI frame format information is included in a General Framing Protocol (GFP) client management frame corresponding to the GFP-T frame into which the basic CPRI frame is mapped; and the reserved value between 00000011 and 11111110 in the GFP client management frame is used to indicate carrying said basic CPRI frame format information.

26. The primary baseband processing unit of claim 25, wherein said means for mapping comprises:
means for performing 8B/10B to 64B/65B line encoding transformation on the CPRI link, and said reproducing means comprises means for performing 64B/65B to 8B/10B line encoding transformation.

27. A distributed base station system, wherein a remote radio frequency unit communicates with a primary baseband processing unit through an integrated or separate transceiver device via a SDH link, wherein the transceiver device comprises:

a transmission processing device, comprising:
means for mapping a CPRI link to a GFP-T frame;
means for encapsulating the GFP-T frame into SDH virtual containers; and
means for forming a STM-N frame; and
a reception processing device, comprising:
means for separating SDH virtual containers from a STM-N frame;
means for extracting a GFP-T frame from the SDH virtual containers; and
means for reproducing a CPRI frame from the GFP-T frame;
wherein said means for mapping comprises:
means for performing compression to a basic CPRI frame before the mapping to remove reserved bits, the means for performing compression including information indicating compression state of the CPRI frame in the GFP-T frame; and
means for transmitting information indicating the format in the uncompressed basic CPRI frame, and
said means for reproducing comprising:
means for determining whether the basic CPRI frame is compressed based on said information indicating the compression state, and if the basic CPRI frame is compressed, decompressing the compressed basic CPRI frame based on said format information of the basic CPRI frame; wherein
said basic CPRI frame format information is included in a GFP client management frame corresponding to the GFP-T frame into which the basic CPRI frame is mapped; and the reserved value between 00000011 and 11111110 in the GFP client management frame is used to indicate carrying said basic CPRI frame format information.

28. The system of claim 27, wherein said means for mapping comprises:
means for performing 8B/10B to 64B/65B line encoding transformation on the CPRI link, and
said reproducing means comprises means for performing 64B/65B to 8B/10B line encoding transformation.

29. The system of claim 27, wherein said means for generating comprises means for obtaining the basic CPRI frame format information through monitoring the control and management channel supported by CPRI.

30. The system of claim 29, wherein said control and management channel is a HDLC channel or Ethernet channel.

31. The system of claim 27, wherein said means for generating comprises means for obtaining the basic CPRI frame format information through analyzing the CPRI link data stream.

32. The system of claim 27, further comprising representing the information indicating the CPRI frame's compression state through the user payload identifier of a user data frame.

33. The system of claim 32, wherein the information indicating the CPRI frame's compression state is able to take a value between 00001001 and 11101111.

34. The system of claim 27, wherein said means for compressing is configured to sequentially arrange individual A×C containers in order in the basic CPRI frame.

35. The system of claim 27, wherein the basic CPRI frame format information is transmitted only at time of initial start or change of basic CPRI frame format.

36. The system of claim 27, wherein the basic CPRI frame format information is transmitted in a low frequency.

37. The system of claim 27, wherein said means for reproducing is configured to recovery the clock of CPRI link through a global common clock or an adaptive clock recovery technique.

* * * * *